F. L. SATTLEY AND F. N. ROSS.
THREAD MILLING MACHINE.
APPLICATION FILED FEB. 14, 1919.
1,325,584.
Patented Dec. 23, 1919.
2 SHEETS—SHEET 1.
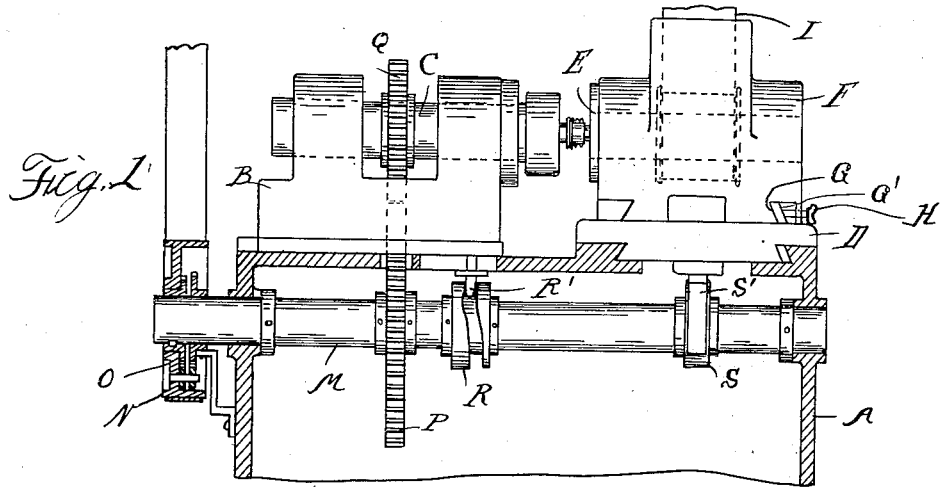
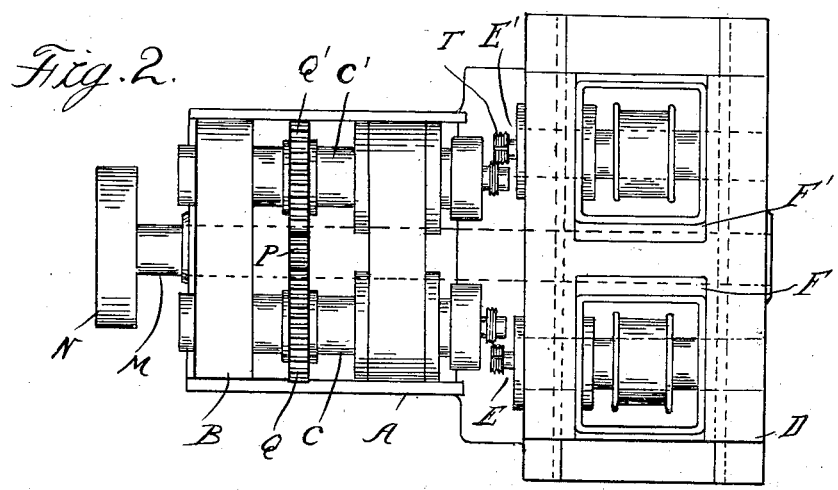
Inventors
Frederick L. Sattley
Frederick N. Ross
By Whittemore Hulbert & Whittemore
Attorneys

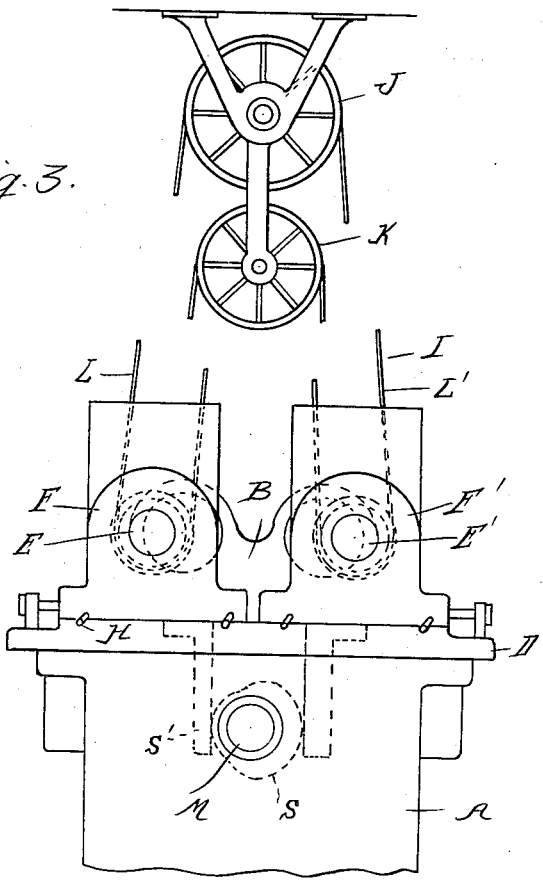

UNITED STATES PATENT OFFICE.

FREDERICK L. SATTLEY AND FREDERICK N. ROSS, OF DETROIT, MICHIGAN, ASSIGNORS TO GENERAL METALS COMPANY, OF DETROIT, MICHIGAN, A CORPORATION OF MICHIGAN.

THREAD-MILLING MACHINE.

1,325,584.  Specification of Letters Patent.  Patented Dec. 23, 1919.

Application filed February 14, 1919. Serial No. 276,936.

*To all whom it may concern:*

Be it known that we, FREDERICK L. SATTLEY and FREDERICK N. ROSS, both citizens of the United States of America, residing at Detroit, in the county of Wayne and State of Michigan, have invented certain new and useful Improvements in Thread-Milling Machines, of which the following is a specification, reference being had therein to the accompanying drawings.

The invention relates to thread milling machines of that type in which there are a plurality of work spindles which are successively brought into operative relation to the thread milling cutter, the arrangement being such as to permit of engaging the work with one of said spindles while the milling operation is performed upon the work on another of the spindles. As heretofore constructed such machines have been provided with work-holding spindles journaled in fixed bearings, while the milling cutter has been mounted upon a carriage having a compound movement. Thus it is necessary to carry the cutter not only from one spindle to another, but also to adjust the cutter axially in timed relation to the rotation of the spindle so as to produce the proper pitch of thread. This compound movement has been controlled by cams, with the necessity of exchanging cams to suit the requirements of different work. With our improved construction the machine is simplified by dispensing with the compound movement of the carriage for the cutter and by dividing the movements necessary in cutting the threads between the cutter and the work spindles. As a consequence, one of the members may be moved axially and the other in a direction transverse to the axes, which is effected with less difficulty than the compound movement of one member. A further improvement is the provision of a plurality of cutter spindles corresponding in number to the work spindles, together with independent means of adjustment so that each cutter may be properly adjusted in relation to the work on its coöperating spindle. This permits of grinding the cutters and then re-setting them to produce uniform length.

In the drawings:

Figure 1 is a side elevation, partly in section, of a thread milling machine;

Fig. 2 is a plan view thereof;

Fig. 3 is an end elevation.

A is the frame of the machine, B is a carriage on the frame on which are mounted a plurality of work-holding spindles C and C' arranged in parallelism. The carriage B is also mounted on the frame so as to be capable of longitudinal movement parallel to the axes of the spindles. D is a carriage mounted on the frame A so as to be capable of transverse movement or at right angles to the axes of the spindles. E and E' are cutter spindles mounted on the carriage D in axial parallelism to the spindles C and C'. The bearings F and F' for the spindles E and E' are also adjustable transversely of their axes on the carriage D, preferably by engaging guideways G having clamping gibs G' and set screws H. I is a driving belt for the spindles E and E', which, as shown, passes over the pulleys J and K with loops L and L' for engaging pulleys on the respective spindles E and E', thereby permitting of the relative adjustment of said spindles.

M is a drive shaft which is driven by a pulley N, and to reduce the angular speed of the shaft relatively to that of the pulley the two are connected through a reduction gearing O, preferably of the planetary type. P is a spur gear upon the shaft M which is in mesh with pinions Q and Q' on the work spindles C and C' and which permits of a limited adjustment of the carriage B while retaining operative relation to the pinions. R is a cam upon the shaft M engaging a bearing R' on the carriage B and fashioned to produce a predetermined reciprocation of the carriage timed in relation to the rotation of the spindles thereon. S is a cam upon the shaft M coöperating with a bearing S' on the carriage D and fashioned to produce a predetermined reciprocatory movement of said carriage in timed relation to the reciprocation of the carriage B and also the rotation of the spindles C and C'.

With the construction as described, the work spindles being provided with suitable chucks (not shown) the work to be threaded may be engaged therewith. Suitable threading cutters T are mounted upon the cutter spindles E and E' and adjustment is made so that each of these cutters will be brought into operative relation to the work on its corresponding work spindle. Preferably the spindles E and E' are arranged outside of the spindles C and C' so that in the movement of the carriage D in one direction the cutter on the spindle E is brought into engagement with the work on the spindle C, while the movement of the carriage D in the opposite direction will bring the cutter on the spindle E' into engagement with the work on the spindle C'. Thus, in operation while the work is being engaged with one of the spindles C and C' the operation of the cutter is being performed on the work on the other spindle, and by reason of the timed relation of the cams and gearing the work spindles will be moved axially at the same time that the spindle rotates the work in relation to the cutter. Thus at the completion of a revolution of the spindle the latter has been moved axially an amount equal to the pitch of the thread.

What we claim as our invention is:

1. In a thread milling machine, the combination with a frame, of carriages mounted on said frame for rectilinear movement in directions transverse to each other, a work spindle, and a cutter spindle mounted on the respective carriages, means for rotating said spindles, means for actuating one of said carriages to move said cutter into and out of engagement with the work, means for actuating the other of said carriages to advance the cutter axially of the work, said movements being in timed relation to each other and to the rotation of the work spindle.

2. In a thread milling machine, the combination with a frame, of carriages mounted on said frame for rectilinear movement in directions transverse to each other, a work spindle and a cutter spindle mounted on the respective carriages, means for rotating said spindles, means for reciprocating one of said carriages to move said cutter into and out of engagement with the work dwelling for an interval at each extreme of its movement, means for actuating the other carriage to advance said cutter axially of the work, said movements being timed in relation to each other and to the rotation of said work spindle to effect milling of the thread.

3. In a thread milling machine, the combination with a frame, of a pair of carriages mounted on said frame for rectilinear movement in directions transverse to each other, a plurality of work spindles mounted on one carriage, a plurality of cutter spindles mounted on the other carriage, means for rotating said spindles, means for reciprocating one of said carriages a sufficient distance to carry the cutters into and out of engagement with the work, one of said cutters being in engagement with the work on its corresponding spindle when another of said cutters is disengaged from the work on its spindle, means for reciprocating the other of said carriages to advance the cutters axially of the work, the cutters in engagement with the work directing the different phases of the reciprocation, being on opposite sides of the axis, said movements being timed with each other and with the rotation of the work spindles.

4. In a thread milling machine, the combination with a frame, of carriages mounted to be slidable upon said frame in transverse directions, a plurality of work spindles mounted on one of said carriages with their axes parallel to the direction of movement, a corresponding number of cutter spindles mounted on the other carriage and in operative relation to the respective work spindles, a drive shaft on said frame having a gear connection to said work spindles permitting of the longitudinal movement thereof, and cams on said drive shaft operatively engaging the respective carriages to actuate the same transversely in timed relation to each other and to the rotation of the work spindle.

5. In a thread milling machine, the combination with a frame, of a pair of carriages mounted on said frame to be slidable in transverse directions, a plurality of work spindles on one of said carriages with their axes parallel to the direction of movement, a corresponding number of cutter spindles on the other carriage arranged to be alternately moved into operative relation to their respective work spindles, a drive shaft on said frame parallel to the axes of said spindles, a gear train between said drive shaft and the work spindles permitting of the longitudinal movement thereof, and cams on said drive shaft operatively engaging the respective carriages to actuate the same transversely in timed relation to each other and to the rotation of said work spindles.

6. In a thread milling machine, the combination with a frame, of a drive shaft mounted in said frame, a drive pulley for said shaft, a differential speed reduction gearing between said pulley and shaft, a pair of carriages mounted on said frame to be slidable respectively parallel to said drive shaft and transversely thereof, a plurality of work spindles mounted parallel to the direction of movement of the carriage which is parallel to said drive shaft, a corresponding number of cutter spindles mounted on the other carriage with their axes parallel to the work spindles and arranged to be alternately moved into operative relation thereto, a gear train for driving said work spindles from said drive shaft permitting of the longitudinal adjustment of said spindles, and cams on said drive shaft for operating said carriages transversely in timed relation to each other and to the rotation of said work spindles.

7. In a thread milling machine, the combination with a frame, of a plurality of work spindles and a corresponding number of cutter spindles arranged with their axes in parallelism, means for relatively moving said work spindles and cutter spindles parallel to and transversely of the axes thereof to alternately operatively engage the cutters with the work on the respective spindles, and means for independently adjusting each of said cutter spindles in relation to its work spindle.

8. In a thread milling machine, the combination with a frame, of a plurality of work spindles mounted thereon, a corresponding number of cutter spindles arranged in axial parallelism, means for relatively moving said spindles to alternately operatively engage the cutters with the work on the respective work spindles, means for independently adjusting said cutter spindles in relation to each other and their respective work spindles, drive pulleys on said cutter spindles, a single drive belt passing around said drive pulleys, and an intermediate idler pulley for said drive pulley forming a pair of loops in the belt permitting of the independent adjustment of said spindles.

9. In a thread milling machine, the combination with a frame, a plurality of work spindles associated therewith and mounted on parallel axes, a plurality of cutter spindles, one for each work spindle, mounted on axes parallel thereto, means for moving the work spindles bodily in one direction, means for moving the cutter spindles bodily in a transverse direction, and means for coordinating their movements in timed relation to the cutting of a thread.

10. In a thread milling machine, the combination with a frame, of carriages mounted to be slidable upon said frame in transverse directions, a plurality of work spindles mounted on one of said carriages with their axes parallel to the direction of movement, a corresponding number of cutter spindles mounted on the other carriage and in operative relation to the respective work spindles, a drive shaft on said frame having a gear connection to said work spindles permitting of the longitudinal movement thereof, and cams on said drive shaft operatively engaging the respective carriages to actuate the same transversely in timed relation to each other and to the rotation of the work spindle.

11. In a thread milling machine, the combination with a frame, of a pair of carriages mounted on said frame to be slidable in transverse directions, a plurality of work spindles on one of said carriages with their axes parallel to the direction of movement, a corresponding number of cutter spindles on the other carriage arranged to be alternately moved into operative relation to their respective work spindles, a drive shaft on said frame parallel to the axes of said spindles, a gear train between said drive shaft and the work spindles permitting of the longitudinal movement thereof, and cams on said drive shaft operatively engaging the respective carriages to actuate the same transversely in timed relation to each other and to the rotation of said work spindles.

12. In a thread milling machine, the combination with a frame, of a drive shaft mounted on said frame, a drive pulley for said shaft, a differential speed reduction gearing between said pulley and shaft, a pair of carriages mounted on said frame to be slidable respectively parallel to said drive shaft and transversely thereof, a plurality of work spindles mounted parallel to the direction of movement of the carriage which is parallel to said drive shaft, a corresponding number of cutter spindles mounted on the other carriage with their axes parallel to the work spindles and arranged to be alternately moved into operative relation thereto, a gear train for driving said work spindles from said drive shaft permitting of the longitudinal adjustment of said spindles, and cams on said drive shaft for operating said carriages transversely in timed relation to each other and to the rotation of said work spindles.

13. In a thread milling machine, the combination with a frame, of a plurality of work spindles and a corresponding number of cutter spindles arranged with their axes in parallelism, means for relatively moving said work spindles and cutter spindles parallel to and transversely of the axes thereof to alternately operatively engage the cutters with the work on the respective spindles, and means for independently adjusting each of said cutter spindles in relation to its work spindle.

14. In a thread milling machine, the combination with a frame, of a plurality of work spindles mounted thereon, a corresponding number of cutter spindles arranged in axial parallelism, means for relatively moving said spindles to alternately operatively engage the cutters with the work on the respective work spindles, means for independently adjusting said cutter spindles in relation to each other and their respective work spindles, drive pulleys on said cutter spindles, a single drive belt passing around said drive pulleys, and an intermediate idler pulley for said drive pulley forming a pair of loops in the belt permitting of the independent adjustment of said spindles.

15. In a thread milling machine, the combination with a frame, a plurality of work spindles associated therewith and mounted on parallel axes, a plurality of cutter spindles, one for each work spindle, mounted on axes parallel thereto, means for moving the work spindles bodily in one direction, means for moving the cutter spindles bodily in a transverse direction, and means for coördinating their movements in timed relation to the cutting of the thread.

16. In a thread milling machine, the combination with a frame, a plurality of sliding carriages associated therewith, arranged to move in transverse directions, a plurality of work spindles mounted with parallel axes, a cutter spindle for each work spindle, mounted to move in a lateral direction to and from its work spindle, a cutter for each cutter spindle, and means for moving one cutter into engagement with the work while moving another cutter out of engagement with the work.

17. In a thread milling machine, the combination with a frame, a laterally moving carriage mounted thereon, a pair of cutters associated with said carriage, a pair of work spindles capable of holding work in position to be operated upon by the cutters, means for causing the cutter carriage, in its movement, to move a cuter in a transverse direction toward the work in one work spindle, and simultaneously causing the other cutter to move in a transverse direction away from the work in the other work spindle.

18. In a thread milling machine, the combination with a frame, a pair of work holding spindles, a cutter for each work spindle, mounted to move in a direction transverse to the axes thereof, said movement being so arranged as to cause one cutter to move toward the work in one work spindle, while the other cutter is moving away from the work in the other spindle.

19. In a thread milling machine, the combination with a frame, a work holding spindle, having movement longitudinally of its axis, a cutter associated therewith, and arranged to move toward the work spindle from one direction, another work spindle, mounted with its axis parallel to the first one, a cutter associated therewith, and arranged to move toward its work spindle from a direction opposite to the first-mentioned cutter, and means for moving the two cutters in their respective directions.

20. In a thread milling machine, the combination with a frame, a work holding spindle, a cutter mounted with axis parallel to the axis of the work spindle, but to one side thereof, another work holding spindle and a cutter mounted in a relatively opposite position to its work holding spindle as the first-mentioned cutter, and means for causing the cutters to alternately move into and out of engagement with the work in their respective work holding spindles.

21. In a thread milling machine, the combination with a frame, a plurality of work spindles, with parallel axes, a threading cutter associated with each of the work spindles, and arranged to move in a direction transverse of the axes thereof, means for rotating the work spindles, means for rotating the cutters, means for moving the cutters into engagement with the work in the work spindle, means for longitudinally changing the relative positions of the contacting points of the cutter teeth with the engaged work equal to the lead of the thread that is being cut, and means for coördinating these movements in timed relation to the cutting of a thread.

22. In a thread milling machine, the combination with a frame, of a plurality of work spindles, a sliding carriage, a plurality of cutters, rotating in suitable heads mounted thereon, and arranged to alternately operatively engage work in the work spindles, means for adjusting the heads independently of the carriage, and means for securely locking the heads to the carriage.

23. In a thread milling machine, the combination with a frame, of a plurality of work spindles, a sliding carriage, a plurality of independently adjustable cutter heads associated therewith, and arranged to alternately operatively engage work in the work spindles, a micrometer for each cutter head, and means for independently adjusting each cutter head.

24. In a thread milling machine, the combination with a frame, a plurality of work spindles, a sliding carriage, a plurality of independently adjustable cutter heads each having divided spindle bearings, associated therewith, a pulley mounted between said bearings, and means for adjusting one head independent of the other.

25. In a thread milling machine, the combination with a frame, a plurality of work spindles, a plurality of cutter spindles mounted in independently adjustable cutter heads, each having divided spindle bearings, a pulley mounted between the divided bearings on each head, and a single belt arranged to rotate the cutter spindles simultaneously.

26. In a thread milling machine, the combination with a plurality of work holding spindles mounted in axial parallelism, and arranged to be moved bodily at predetermined intervals, a plurality of rotatable cutter spindles associated therewith, each arranged to operatively engage work in different work spindles and to move bodily toward and away from said spindle, at predetermined intervals, means for causing the movement of the various spindles in timed relation to the cutting of a thread.

27. In a thread milling machine, the combination with a plurality of bodily movable rotatable work holding means mounted in axial parallelism, a plurality of independently adjustable heads, carrying thread cutting tools, each arranged to operatively engage work in different work holding means and be moved bodily toward and away from the work in such a work-holding means at predetermined intervals, means for independently adjusting the heads, and means for coördinating the movement of the various parts in timed relation to the cutting of a thread.

28. In a thread milling machine, the combination with a plurality of rotatable work holding means, a plurality of independently adjustable heads, carrying thread cutting tools, and mounted on a slidable carriage, each arranged to operatively engage work in different work holding means and move bodily toward and away from work in said work holding means at predetermined intervals, means for independently adjusting, and separate means locking the thread cutting tools in fixed positions on the sliding carriage.

29. In a thread milling machine, the combination with a plurality of rotatable work holding means, a plurality of thread cutting means associated therewith, each arranged to operatively engage work in different work holding means and move toward and away from the work in said work holding means, means for rotating the cutters, and means for holding the cutters in cutting engagement with the work during substantially one revolution of the work holding means.

30. In a thread milling machine, the combination with a plurality of rotatable work holding means, a plurality of thread cutters associated therewith, each arranged to operatively engage work in different work holding means and move toward and away from the work in said work holding means, means for holding the work in cutting engagement with a thread cutter during substantially one revolution of a work holding means, while forming a thread.

In testimony whereof we affix our signatures.

FREDERICK L. SATTLEY.
FREDERICK N. ROSS.